Patented Feb. 22, 1944

2,342,590

UNITED STATES PATENT OFFICE 2,342,590

COATING COMPOSITION

Joy G. Lichty, Stow, Ohio, assignor to Wingfoot Corporation, Akron, Ohio, a corporation of Delaware No Drawing. Application September 26, 1941, Serial No. 412,471

4 Claims. (Cl. 106—186)

This invention relates to crystallizing varnishes and more particularly lacquers. The crystallizer is a propionitrile or a propionamide. The crystallizing power of the varnish, of course, depends upon the solvent or solvents employed and the film-forming material and other ingredients in the varnish. It may be said, however, in general, that the crystallizers of this invention may be used generally in crystallizing varnishes. The crystallizers of this invention are in general more soluble in aromatic solvents than in aliphatic solvents. They crystallize from naphthas, xylene, toluene, etc. They also crystallize from synthetic solvents, such as esters, etc.

The crystallizers of this invention may be added to various varnishes. They are particularly suited for use in nitrocellulose lacquers and in lacquers of rubber derivatives. They may be used in alcoholic varnishes.

Vegetable oils, such as drying oils, etc. may be added to the lacquers or other varnishes. Coloring pigments and dyestuffs, of course, may be added without interfering with the action of the crystallizer.

The crystallizers of this invention may be used, for example, in lacquers of cyclized rubber, such as the Pliolite lacquers produced by The Goodyear Tire & Rubber Company. For instance, they may be used in Pliolite 131–A which consists of:

| | Parts by weight |
|---|---|
| Cyclized rubber | 2.16 |
| Raw tung oil | 0.08 |
| Mineral spirits | 4.98 |

The following formulas are for crystallizing lacquers made from this particular Pliolite composition. The preparation of the crystallizers employed is described in German Patent No. 670,357.

I

| | |
|---|---|
| Pliolite 131–A parts by weight | 30.0 |
| Xylene parts | 10.0 |
| A 10% solution of beta phenoxy propionitrile in xylene parts | 3.2 |

II

| | |
|---|---|
| Pliolite 131–A parts by weight | 30.0 |
| Xylene parts | 10.0 |
| Beta phenoxy propionitrile do | 6.4 |

III

| | |
|---|---|
| Pliolite 131–A parts by weight | 30.0 |
| Xylene parts | 5.0 |
| A 4% solution of beta (beta naphthoxy) propionitrile in xylene parts | 8.0 |

IV

| | Parts by weight |
|---|---|
| Pliolite 131–A | 30.0 |
| Xylene | 5.0 |
| Ethylene dichloride | 20.0 |
| A 4% solution of beta (beta naphthoxy) propionitrile | 8.0 |

The tung oil may be omitted or a different oil may be added. A vegetable oil, if used, may be employed in larger or smaller quantities than in the Pliolite composition given above.

Instead of employing aryloxy derivatives the beta alkoxy propionitriles may be employed as crystallizers. In general, the higher alkoxy derivatives, up to those including as many as six or eight or ten carbon atoms, are to be preferred to the methoxy derivative. The lower members of the series which are liquid are, of course, not suitable. It is the crystalline members only which can be employed.

Instead of using the propionitriles, propionamides may be used for crystallizing. They may be formed by hydrolysis of the corresponding nitriles. Suitable crystallizers are the beta alkoxy propionamides including the methoxy, ethoxy, butoxy and other alkoxy derivatives up to those containing six, eight or ten carbon atoms. The beta aryloxypropionamides may likewise be used including the phenoxy derivative and the alpha and beta naphthoxy derivatives. The method of preparing phenoxypropionamide is given as illustrating the preparation of the propionamides:

Phenoxypropionitrile was treated with an excess of hydrogen chloride at a temperature of 10–15° C. Isobutyl alcohol and diethyl ether were the solvents used in this reaction. This product was then treated with water to hydrolyze the imino ether hydrochloride and extracted with benzene. The benzene extract was then treated with an aqueous solution of sodium bicarbonate. The resulting benzene solution on evaporation gave the phenoxypropionamide which on recrystallizing from alcohol melted at 118–119° C.

Trichloropropionamide may likewise be used as a crystallizer. This may be formed as follows: 24 parts of dry hydrochloride is added to a solution of 95.3 parts of trichlorpropionitrile in 67 parts of anhydrous isopropyl alcohol. After the solution has become viscous sufficient water is added to cause the solution to separate into two layers. After separation the lower layer is distilled to remove the more volatile constituents. The residue is alpha-dichloro-beta chloropropionamide which on purification melts at 57° C.

What I claim is:

1. A crystallizing varnish which comprises a varnish film-forming ingredient, a solvent therefor as the vehicle, and as the crystallizer a crystalline derivative of the class soluble in said vehicle and consisting of the beta alkoxy and beta aryloxy propionitriles, the beta alkoxy and the beta aryloxy propionamides and trichloropropionamides whose alkoxy groups contain up to ten carbon atoms.

2. A crystallizing varnish of the type claimed in claim 1 characterized by the fact that it contains nitrocellulose as the film-forming ingredient.

3. A crystallizing varnish of the type claimed in claim 1 characterized by the fact that it contains cyclized rubber as the film-forming ingredient.

4. A crystallizing varnish which comprises a varnish film-forming ingredient and as the crystallizing ingredient beta phenoxy propionitrile and a solvent vehicle in which the film-forming ingredient and the crystallizing ingredients are soluble.

JOY G. LICHTY.